United States Patent
Fujishiro

(10) Patent No.: US 12,470,964 B2
(45) Date of Patent: Nov. 11, 2025

(54) COMMUNICATION CONTROL METHOD AND USER EQUIPMENT

(71) Applicant: KYOCERA Corporation, Kyoto (JP)

(72) Inventor: Masato Fujishiro, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 390 days.

(21) Appl. No.: 17/932,704

(22) Filed: Sep. 16, 2022

(65) Prior Publication Data

US 2023/0016369 A1 Jan. 19, 2023

Related U.S. Application Data

(63) Continuation of application No. PCT/JP2021/008647, filed on Mar. 5, 2021.

(30) Foreign Application Priority Data

Mar. 18, 2020 (JP) .................................. 2020-048413

(51) Int. Cl.
*H04W 24/10* (2009.01)
*H04W 72/0453* (2023.01)
*H04W 72/21* (2023.01)
*H04W 80/02* (2009.01)

(52) U.S. Cl.
CPC ....... *H04W 24/10* (2013.01); *H04W 72/0453* (2013.01); *H04W 72/21* (2023.01); *H04W 80/02* (2013.01)

(58) Field of Classification Search
CPC . H04W 24/10; H04W 72/0453; H04W 72/21; H04W 80/02; H04W 72/1221
See application file for complete search history.

(56) References Cited

U.S. PATENT DOCUMENTS

| | | | |
|---|---|---|---|
| 2008/0064386 A1 | 3/2008 | Nibe | |
| 2008/0232260 A1* | 9/2008 | Yeo | H04W 72/52 370/242 |
| 2010/0296449 A1* | 11/2010 | Ishii | H04L 1/1874 370/328 |
| 2010/0322187 A1 | 12/2010 | Tani et al. | |
| 2016/0338132 A1 | 11/2016 | Uchino et al. | |

(Continued)

FOREIGN PATENT DOCUMENTS

| JP | 2000-069548 A | 3/2000 |
|---|---|---|
| JP | 2008-072194 A | 3/2008 |

(Continued)

OTHER PUBLICATIONS

3rd Generation Partnership Project; Technical Specification Group Radio Access Network; NR; Medium Access Control (MAC) protocol specification; 3GPP TS 38.321 V15.8.0; Dec. 2019; pp. 1-78; Release 15; 3GPP Organizational Partners.

Primary Examiner — Sulaiman Nooristany
(74) Attorney, Agent, or Firm — Studebaker Brackett PLLC

(57) ABSTRACT

A communication control method according to a first aspect is a method executed by a user equipment. The communication control method includes the step of measuring a residence time of unsent data to be transmitted by the user equipment to a base station via a logical channel and the step of allocating, based on the residence time, a resource for data transmission to the logical channel.

2 Claims, 12 Drawing Sheets

(56) References Cited

U.S. PATENT DOCUMENTS

2018/0014322 A1\* 1/2018 Loehr ............... H04W 28/0278
2020/0053678 A1\* 2/2020 Moon .................... H04W 76/22
2020/0083946 A1\* 3/2020 You ....................... H04W 76/11

FOREIGN PATENT DOCUMENTS

| JP | 2011-250481 A | 12/2011 |
| JP | 2012-034407 A | 2/2012 |
| WO | 2010/016149 A1 | 2/2010 |
| WO | 2015/141478 A1 | 9/2015 |

\* cited by examiner

COMMUNICATION CONTROL METHOD AND USER EQUIPMENT

RELATED APPLICATIONS

The present application is a continuation based on PCT Application No. PCT/JP2021/008647, filed on Mar. 5, 2021, which claims the benefit of Japanese Patent Application No. 2020-048413 filed on Mar. 18, 2020. The content of which is incorporated by reference herein in their entirety.

TECHNICAL FIELD

The present disclosure relates to a communication control method and a user equipment that are used in a mobile communication system.

BACKGROUND ART

In a mobile communication system based on the 3rd Generation Partnership Project (3GPP) standards, a Medium Access Control (MAC) layer performs logical channel prioritization processing for selecting data to be transmitted in order of priority, based on the priority configured for each of the plurality of logical channels (see, for example, NPL 1). The MAC layer multiplexes data selected by the logical channel prioritization processing into a transmission data block.

CITATION LIST

Non-Patent Literature

NPL 1: 3GPP Technical Specification "TS 38.321 V 15.8.0" December 2019, Internet <URL: http://www.3gpp.org/ftp//Specs/archive/38_series/38.321/38321-f80.zip>

SUMMARY OF INVENTION

A communication control method according to a first aspect is a method executed by a user equipment. The communication control method includes measuring a residence time of unsent data to be transmitted by the user equipment to a base station via a logical channel, and allocating, to the logical channel, a resource for data transmission based on the residence time.

A communication control method according to a second aspect is a method executed by a user equipment. The communication control method includes measuring a residence time of unsent data to be transmitted by the user equipment via a logical channel, and notifying a base station of time information based on the residence time. The time information is information referenced by the base station to allocate an uplink radio resource to the user equipment.

A user equipment according to a third aspect executes the communication control method according to the first aspect or the second aspect.

DESCRIPTION OF EMBODIMENTS

In recent years, studies have been conducted about introducing a mobile communication system based on the 3GPP standards into an industrial network and making at least a part of the industrial network wireless. However, the industrial network requires strict real-time operations, and thus a delay due to processing in a MAC layer as described above may be problematic.

Accordingly, an object of the present disclosure is to enable data requiring low latency to be appropriately transmitted.

A mobile communication system according to a first embodiment will be described with reference to the drawings. In the description of the drawings, the same or similar parts are denoted by the same or similar reference signs.

First Embodiment

Configuration of Mobile Communication System

Figure 1:
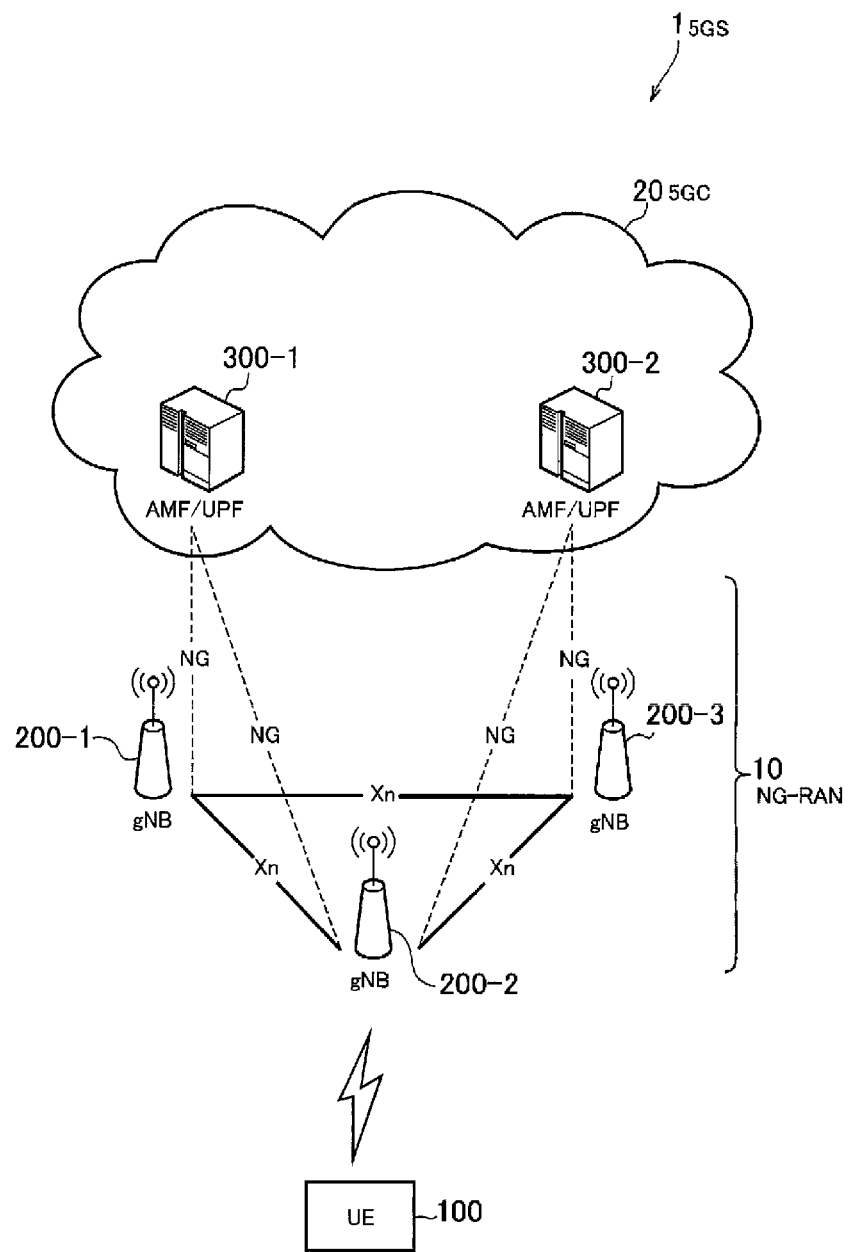
FIG. 1 is a diagram illustrating a configuration of a mobile communication system according to embodiments.

First, a configuration of the mobile communication system according to the first embodiment will be described. FIG. 1 is a diagram illustrating the configuration of the mobile communication system according to the first embodiment. This mobile communication system complies with the 5th Generation System (5GS) of the 3GPP standard. The description below takes the 5GS as an example, but Long Term Evolution (LTE) system may be at least partially applied to the mobile communication system.

As illustrated in FIG. 1, a 5GS 1 includes a User Equipment (UE) 100, a 5G radio access network (Next Generation Radio Access Network (NG-RAN)) 10, and a 5G Core Network (5GC) 20.

The UE 100 is a mobile wireless communication apparatus. The UE 100 may be any apparatus as long as the UE 100 is used by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), and/or a flying object or an apparatus provided on a flying object (Aerial UE).

The NG-RAN 10 includes base stations (referred to as "gNBs" in the 5G system) 200. The gNBs 200 are connected to each other via an Xn interface which is an inter-base station interface. Each gNB 200 manages one or a plurality of cells. The gNB 200 performs wireless communication with the UE 100 that has established a connection to its own cell. The gNB 200 has a radio resource management (RRM) function, a function of routing user data (hereinafter simply referred to as "data"), and/or a measurement control function for mobility control and scheduling. A "cell" is used as a term to indicate a minimum unit of a wireless communication area. A "cell" is also used as a term to indicate a function or a resource for performing wireless communication with the UE 100. One cell belongs to one carrier frequency.

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various kinds of mobility control and the like for the UE 100. The AMF manages mobility of the UE 100 by communicating with the UE 100 by using Non-Access Stratum (NAS) signaling. The UPF controls data transfer. The AMF and UPF are connected to the gNB 200 via an NG interface which is an interface between a base station and the core network.

Figure 2:
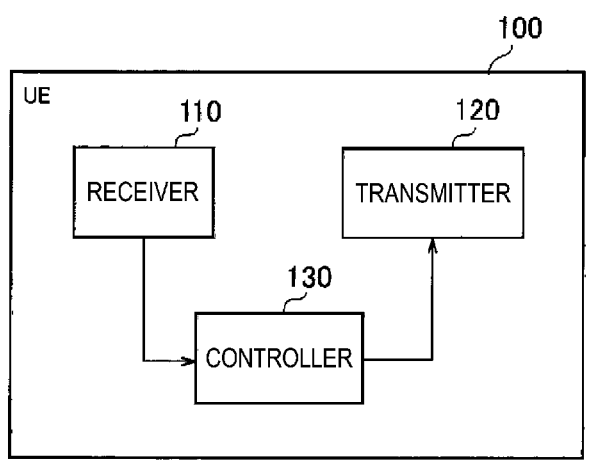
FIG. 2 is a diagram illustrating a configuration of a User Equipment (UE) according to the embodiments.

FIG. 2 is a diagram illustrating a configuration of the UE 100 (user equipment).

As illustrated in FIG. 2, the UE 100 includes a receiver 110, a transmitter 120, and a controller 130.

The receiver 110 performs various kinds of receptions under control of the controller 130. The receiver 110 includes an antenna and a reception device. The reception device converts a radio signal received by the antenna into a baseband signal (a reception signal) and outputs the resulting signal to the controller 130.

The transmitter 120 performs various kinds of transmissions under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various kinds of controls for the UE 100. The controller 130 includes at least one processor and at least one memory. The memory stores programs to be executed by the processor and information to be used for processes by the processor. The processor may include a baseband processor and a Central Processing Unit (CPU). The baseband processor performs modulation and demodulation, and coding and decoding of a baseband signal, and the like. The CPU executes the programs stored in the memory to perform various types of processes.

Figure 3:
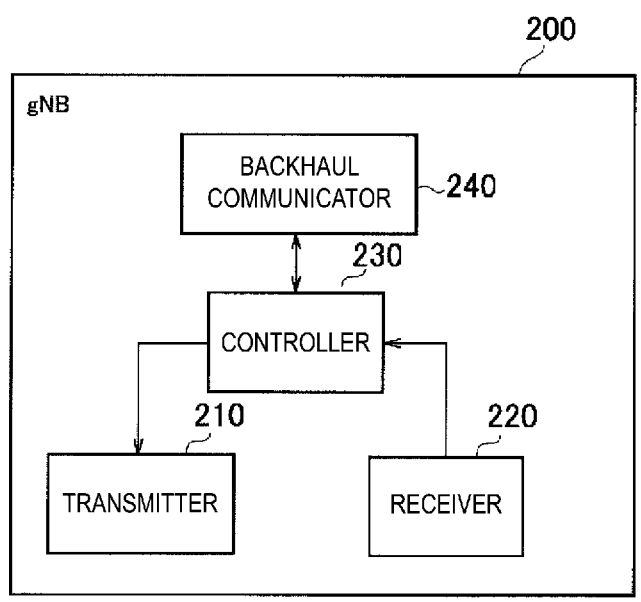
FIG. 3 is a diagram illustrating a configuration of a base station (gNB) according to the embodiments.

FIG. 3 is a diagram illustrating a configuration of the gNB 200 (a base station).

As illustrated in FIG. 3, the gNB 200 includes a transmitter 210, a receiver 220, a controller 230, and a backhaul communicator 240.

The transmitter 210 performs various kinds of transmissions under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various kinds of receptions under control of the controller 230. The receiver 220 includes an antenna and a reception device. The reception device converts a radio signal received through the antenna into a baseband signal (a reception signal) and outputs the resulting signal to the controller 230.

The controller 230 performs various types of control for the gNB 200. The controller 230 includes at least one processor and at least one memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU) and a Distributed Unit (DU) (i.e., functions are divided), and both units may be connected via an F1 interface.

Figure 4:
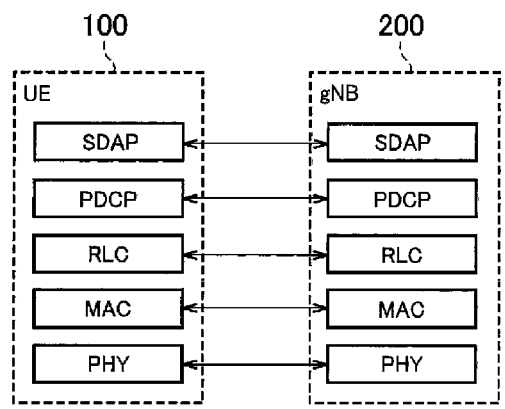
FIG. 4 is a diagram illustrating a configuration of a protocol stack of a radio interface in a user plane handling data.

FIG. 4 is a diagram illustrating a configuration of a protocol stack of a radio interface of a user plane handling data.

As illustrated in FIG. 4, the radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, mapping and demapping of antennas, and mapping and demapping of resources. Data and control information are transmitted between the PHY layer of the UE 100 and the PHY layer of the gNB 200 via a physical channel.

The MAC layer performs priority control of data, a retransmission process through a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines a transport format (a transport block size, a modulation and coding scheme (MCS)) of uplink and downlink, and an allocation resource block for the UE 100.

The RLC layer transmits data to the RLC layer on the reception side by using the functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow which is a unit of QoS control by the core network and a radio bearer which is a unit of QoS control by an Access Stratum (AS). Note that, when the RAN is connected to the EPC, the SDAP may not be provided.

Figure 5:
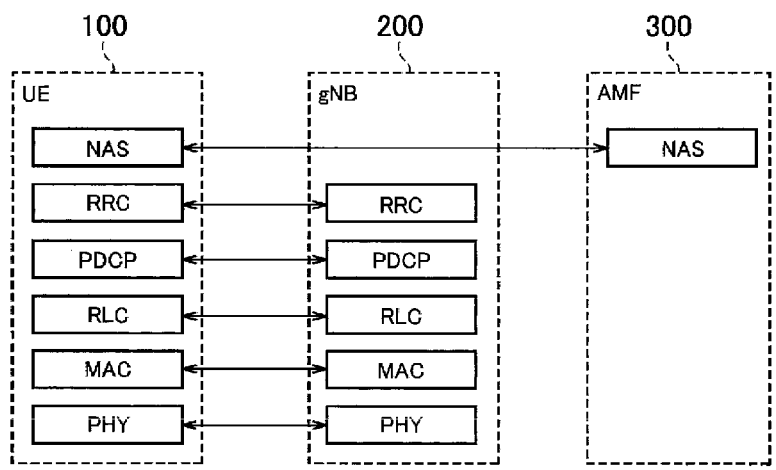
FIG. 5 is a diagram illustrating a configuration of a protocol stack of a radio interface in a control plane handling signaling (control signals).

FIG. 5 is a diagram illustrating a configuration of a protocol stack of a radio interface in a control plane handling signaling (control signals).

As illustrated in FIG. 5, the protocol stack of the radio interface in the control plane includes a Radio Resource Control (RRC) layer and a Non-Access Stratum (NAS) layer instead of the SDAP layer illustrated in FIG. 4.

RRC signaling for various configurations is transmitted between the RRC layer of the UE 100 and the RRC layer of the gNB 200. The RRC layer controls the logical channel, the transport channel, and the physical channel in response to establishment, reestablishment, and release of the radio bearer. When there is a connection (RRC connection) between the RRC of the UE 100 and the RRC of the gNB 200, the UE 100 is in an RRC connected mode. When there is no connection (RRC connection) between the RRC of the UE 100 and the RRC of the gNB 200, the UE 100 is in an RRC idle mode.

The NAS layer higher than the RRC layer performs session management, mobility management, and the like. NAS signaling is transmitted between the NAS layer of the UE 100 and the NAS layer of the AMF 300.

Note that the UE 100 has an application layer and the like other than the protocol of the radio interface.

Overview of Industrial Network

Now, an industrial network according to the first embodiment will be described. In the first embodiment, a scenario is assumed in which a 5GS 1 is introduced into the industrial network and at least a part of the industrial network is made wireless.

Figure 6:
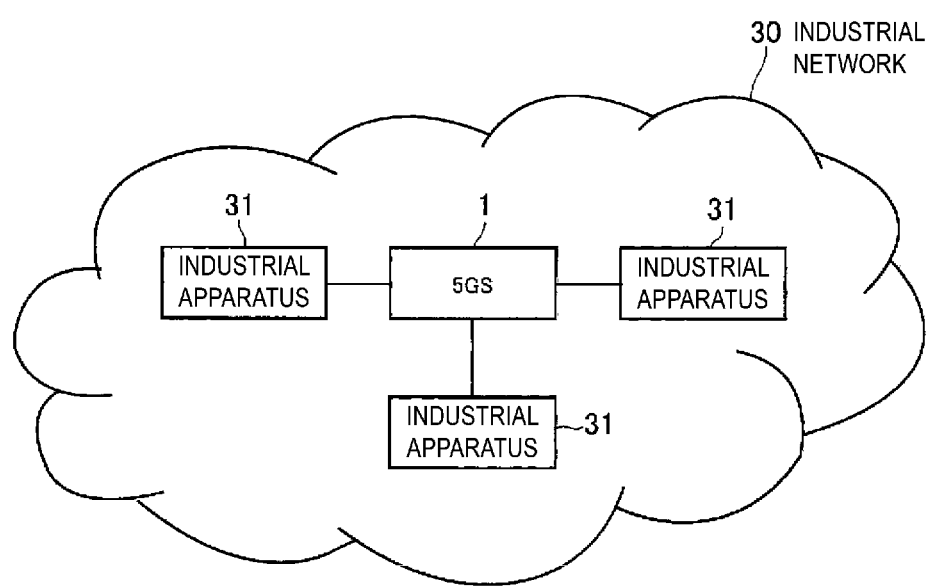
FIG. 6 is a diagram illustrating an assumed scenario according to the embodiments.

FIG. 6 is a diagram illustrating the assumed scenario according to the first embodiment.

As illustrated in FIG. 6, an industrial network 30 includes the 5GS 1 and a plurality of industrial apparatuses 31. At least a part of the industrial network 30 may be provided in a factory. The industrial apparatus 31 includes a programmable logic controller (PLC), a servo controller, a servo motor, an encoder, a sensor, or the like. The industrial apparatus 31 is connected to the UE 100, the UPF, or the like illustrated in FIG. 1, via a gateway apparatus (including a protocol conversion function) or the like. The UE 100 or the UPF may include a protocol conversion function.

A Time Sensitive Networking (TSN) that is the standard of Industrial Ethernet (trade name) including the IEEE 802.1 series, may be applied to the industrial network 30. The TSN is positioned as an upper layer of the PHY layer and the MAC layer of the Ethernet (trade name). For example, the data generated by the industrial apparatus 31 is transmitted by wired communication using the TSN, and the UE 100 receives the transmitted data and transmits the received data to the gNB 200 by wireless communication.

Overview of MAC Layer

Figure 7:
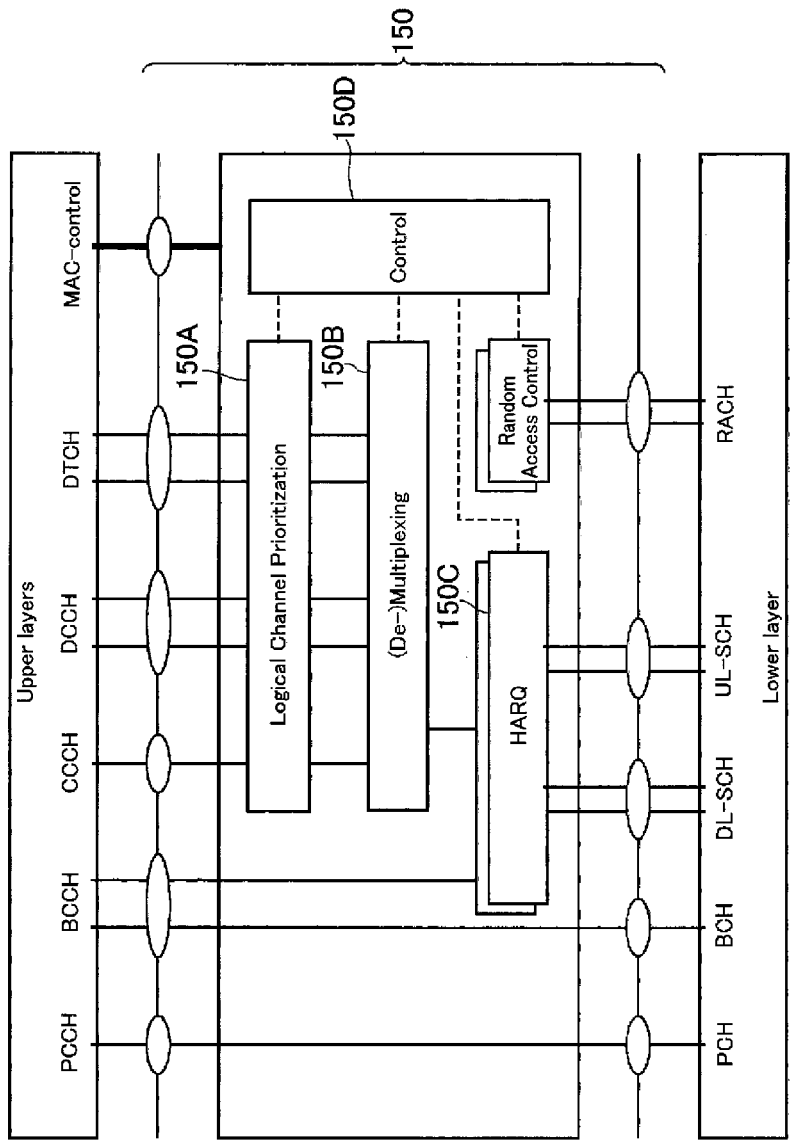
FIG. 7 is a diagram illustrating a configuration of a MAC layer in the UE according to the embodiments.

Now, the MAC layer according to the first embodiment will be described. FIG. 7 is a diagram illustrating a configuration of a MAC layer 150 of the UE 100 according to the first embodiment. Uplink transmission will mainly be described below.

As illustrated in FIG. 7, the MAC layer 150 includes a prioritization unit 150A that performs Logical Channel Prioritization (LCP) processing, a multiplexer 150B that performs Multiplexing processing, an HARQ unit 150C that performs HARQ processing, and a MAC controller 150D that performs Control of each of these processing operations.

The prioritization unit 150A selects the data to be transmitted in order of priority based at least on the priority configured for each of the plurality of logical channels.

The logical channels input to the prioritization unit 150A include a Common Control Channel (CCCH), a plurality of Dedicated Control Channels (DCCHs), and a plurality of Dedicated Traffic Channels (DTCHs).

The CCCH is a logical channel for transmitting control information common to UEs with no RRC connection. The DCCH is a logical channel for transmitting UE-dedicated (UE-specific) control information. The DTCH is a logical channel for transmitting UE-dedicated (UE-specific) data. The logical channel prioritization processing performed on the plurality of DTCHs will mainly be described below.

To map each logical channel to a transport channel, specifically, to a data block (Transport Block (TB)) to be transmitted by the PHY layer, the prioritization unit 150A determines the transmission priority of the transmission data, based on the priority of each logical channel and a transmission bit rate (Prioritized Bit Rate (PBR)) for which QoS of a radio bearer is taken into account.

The prioritization unit 150A maps data to the transport channel in order from the data having the highest transmission priority at the time when the UE 100 receives uplink grant (i.e., uplink radio resource allocation) from the gNB 200. Note that the MAC controller 150D acquires, from the RRC layer, a logical channel number corresponding to each radio bearer, the priority of each logical channel, PBR, and the like when connecting to the gNB 200.

The multiplexer 150B multiplexes the data selected by the logical channel prioritization processing of the prioritization unit 150A into the data block (transport channel) to be transmitted. Specifically, the data block is generated by sequentially storing data output from the prioritization unit 150A in the data block. The data block may be referred to as a MAC Protocol Data Unit (PDU) or a transport block.

The HARQ unit 150C transmits the data block while applying HARQ to the data block output by the multiplexer 150B.

The MAC controller 150D controls the prioritization unit 150A, the multiplexer 150B, and the HARQ unit 150C, based on various parameters configured by the RRC layer.

Overview of LCP Processing

Figure 8:
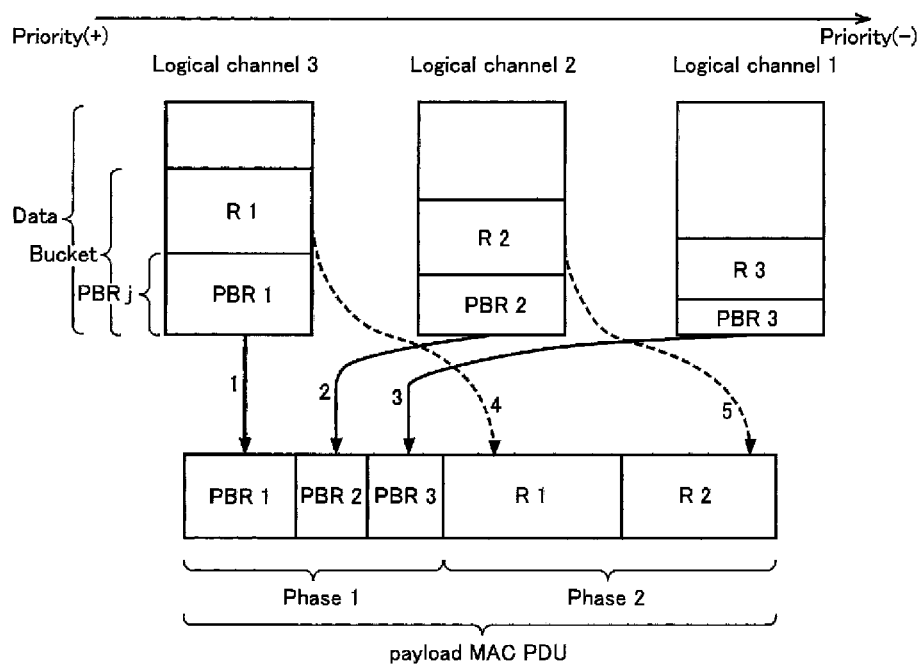
FIG. 8 is a diagram illustrating an example of LCP processing according to the embodiments.

Now, LCP processing according to the first embodiment will be described. FIG. 8 is a diagram illustrating an example of LCP processing. The LCP processing is processing for determining what amount of data is to be allocated to which logical channel when pieces of data of a plurality of logical channels are multiplexed into one data block. The prioritization unit 150A executes the LCP processing each time the UE 100 performs a new transmission.

As illustrated in FIG. 8, a Priority is configured for each Logical channel. For example, the value of the priority is in the range from 1 to 8. A higher priority value indicates a lower priority level, e.g., a priority value of "1" is the highest priority. In the example of FIG. 8, Logical channel 3 is a logical channel having the highest priority, Logical channel 2 is a logical channel having the second highest priority, and Logical channel 1 is a logical channel having the third highest priority.

The Prioritized Bit Rate (PBR) is configured for each logical channel. The PBR is the lowest bit rate that is guaranteed for the logical channel.

The priority and PBR of each logical channel are communicated to the RRC layer of the UE 100 from the RRC layer of the network via the logical channel configuration message when the logical channel is configured. In response to receiving the logical channel configuration message, the RRC layer of the UE 100 configures a required logical channel and transmits the LCP and PBR information of each logical channel to the MAC layer of the UE 100 (MAC controller 150D).

The MAC layer (prioritization unit 150A and MAC controller 150D) of the UE 100 determines the amount of transmission data for each logical channel using rules described below for radio resources (uplink radio resources) allocated by the gNB 200 each time transmission to the gNB 200 is performed.

In a first phase (Phase 1), the MAC layer of the UE 100 allocates a resource corresponding to the PBR of each logical channel to corresponding logical channel in descending order of priority of the logical channel. Here, the "resource" refers to the amount of data in the data block (payload MAC PDU) or a radio resource corresponding to the amount of data.

FIG. 8 illustrates an example in which the MAC layer of the UE 100 first allocates a resource corresponding to PBR 1 of Logical channel 3 having the highest priority, second allocates a resource corresponding to PBR 2 of Logical channel 2 having the second highest priority, and third allocates a resource corresponding to PBR 3 of Logical channel 1 having the third highest priority.

In a second phase (Phase 2), in a case that any resources remain allocatable, the MAC layer of the UE 100 allocates remaining resources to the logical channels in descending order of priority of the logical channels until the data of the logical channel or the remaining resources are exhausted.

FIG. 8 illustrates an example in which the MAC layer of the UE 100 first allocates a resource R1 to Logical channel 3 having the highest priority, and a resource R2 to Logical channel 2 having the second highest priority.

Communication Control Method According to First Embodiment

Now, given the above description, a communication control method according to the first embodiment will be described.

In common LCP, the PBR enables the minimum throughput to be guaranteed on a long-time average. However, guaranteeing a throughput during a short time such as for each packet is difficult.

In particular, assuming an industrial network as described above, communication timeout time may be configured for each bearer. The bearer and the logical channel are in a one-to-one relationship, and thus it may be conceivable that the communication timeout time is configured for each logical channel. The communication timeout time is the time during which the application can continue communication service with no expected message. The communication timeout time may be a type of Quality of Service (QoS) parameter for each bearer. Such communication timeout time may be referred to as a Survival time.

Figure 9:
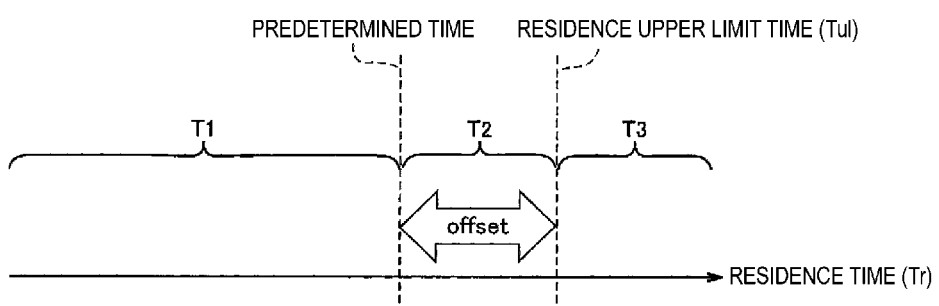
FIG. 9 is a diagram illustrating overview of a communication control method according to a first embodiment.

FIG. 9 is a diagram illustrating an overview of a communication control method according to the first embodiment.

As illustrated in FIG. 9, the MAC layer of the UE 100 measures the residence time (Tr) of unsent data to be transmitted to the gNB 200 via a logical channel, and based on the residence time (Tr), allocates a resource for data transmission to the logical channel. In this way, the concept of the residence time is introduced into the LCP to allow for preferential transmission before the residence time reaches a residence upper limit time (Tul).

The MAC layer of the UE 100 executes the communication control method according to the first embodiment in units of logical channels. The MAC layer of the UE 100 may apply the communication control method according to the first embodiment to each of all the logical channels configured for the UE 100. Alternatively, the MAC layer of the UE 100 may apply the communication control method according to the first embodiment exclusively to some of the logical channels configured for the UE 100 (e.g., the logical channels corresponding to the bearers for which the communication timeout time is configured). Hereinafter, one logical channel to which the communication control method according to the first embodiment is applied is referred to as a "target logical channel".

In the first embodiment, the MAC layer of the UE 100 allocates a resource to the target logical channel preferentially over other logical channels to inhibit the measured residence time (Tr) from exceeding the residence upper limit time (Tul) configured for the target logical channel. The residence upper limit time (Tul) may be a variable parameter configured for each logical channel for the UE 100 by the gNB 200. The residence upper limit time (Tul) may be configured by the logical channel configuration message of the RRC layer. The above-described communication timeout time may be used as the residence upper limit time (Tul).

For example, in a case that the residence time (Tr) in the target logical channel reaches a predetermined time, the MAC layer of the UE 100 performs priority resource allocation in which the resource that is larger than a predetermined resource is allocated to the target logical channel regardless of the priority configured for the target logical channel. Here, the predetermined time is shorter than the residence upper limit time (Tul). The predetermined resource is the minimum resource guaranteed for the target logical channel (i.e., the resource corresponding to the PBR). In a case that the residence time (Tr) reaches the predetermined time in the target logical channel, the MAC layer of the UE 100 may perform interruption such that the resource allocation to the target logical channel is performed earlier even in a case that any other logical channel has a high priority order.

In this way, the MAC layer of the UE 100 allocates a resource to the target logical channel preferentially over other logical channels in a case that the residence time (Tr) in the target logical channel is expected to exceed the residence upper limit time (Tul). This enables the data of the target logical channel to be preferentially transmitted and inhibits the residence time (Tr) in the target logical channel from exceeding the residence upper limit time (Tul).

In the example of FIG. 9, the MAC layer of the UE 100 executes normal LCP processing during a period T1 before the residence time (Tr) reaches the predetermined time. However, in a case that the residence time (Tr) reaches the predetermined time, in other words, in a case that the residence time (Tr) is within a period T2 from the predetermined time to the residence upper limit time (Tul), the MAC layer of the UE 100 performs priority resource allocation on the target logical channel.

However, for example, in a case that the amount of uplink radio resource allocated to the UE 100 by the gNB 200 is insufficient, the residence time (Tr) in the target logical channel may exceed the residence upper limit time (Tul) even in a case that the priority resource allocation as described above is performed. (See period T3 in FIG. 9). In real-time control required for the industrial network, old data may cause control failure. Thus, the MAC layer of the UE 100 may discard data for which the residence time (Tr) exceeds the residence upper limit time (Tul) instead of transmitting the data. Alternatively, even during the period T3, the priority resource allocation as described above may be continued. Whether to discard the data or continue the priority resource allocation may be selected by configuration provided by the gNB 200. The UE 100 may notify the gNB 200 whether to discard the data or to continue the priority resource allocation or may request (preference) the gNB 200 to discard the data or to continue the priority resource allocation. For example, the UE 100 may perform the notification based on a request made by or a configuration provided by the industrial apparatus (application) to which the UE 100 is connected.

Figure 10:
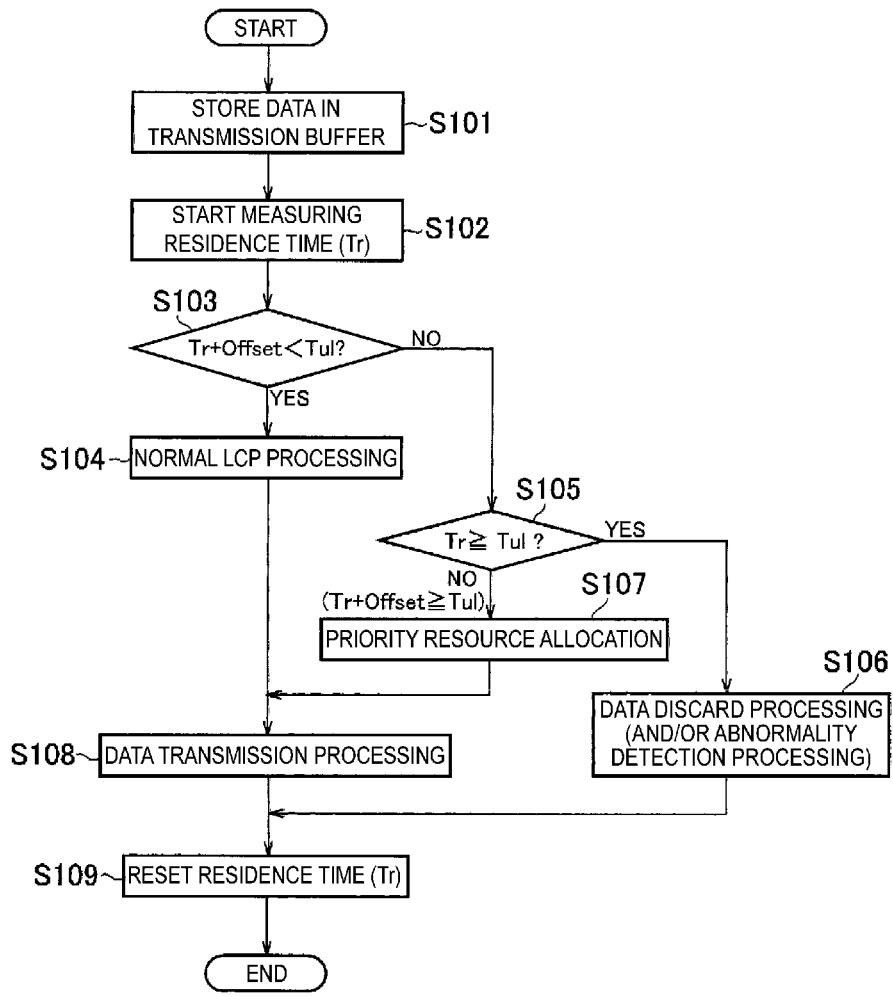
FIG. 10 is a diagram illustrating a flowchart example of the communication control method according to the first embodiment.

FIG. 10 is a diagram illustrating a flowchart example of the communication control method according to the first embodiment.

As illustrated in FIG. 10, in step S101, data is stored in a transmission buffer associated with the target logical channel. Such a transmission buffer may be provided in the RLC layer or the MAC layer of the UE 100. The data stored in the transmission buffer is referred to as unsent data.

In step S102, the MAC layer of the UE 100 starts measuring the residence time (Tr) of the unsent data stored in the transmission buffer in step S101. For example, the MAC layer of the UE 100 may start measuring the residence time (Tr) at timing when the unsent data is stored in the transmission buffer associated with the target logical channel. The MAC layer of the UE 100 may start measuring the residence time (Tr) at timing when the unsent data is recognized. The MAC layer of the UE 100 may recognize the unsent data from a notification from an upper layer (e.g., application layer) of the MAC layer, or may recognize the data as unsent data when the data enters the MAC layer.

The time to start measurement of the residence time (Tr) may be 1) a time point when a packet is generated in the logical channel, 2) a time point when a packet enters the MAC layer, 3) a time point when a packet enters the RLC layer, 4) a time point when a packet enters the PDCP layer, or 5) a time point when a packet enters the SDAP layer. Here, in a case that another layer other than the MAC layer is a measurement start point (e.g., the case of 3), 4) or 5)), such another layer may notify the MAC layer of clock time information regarding the measurement start or time information regarding the time for which the data resides in the other layer.

The measurement of the residence time (Tr) may be performed collectively on a plurality of packets or may be performed on each packet. Note that in the present embodiment, it is mainly assumed that the measurement of the residence time (Tr) is performed on each logical channel and is collectively performed on a plurality of packets.

In step S103, the MAC layer of the UE 100 determines whether the time obtained by adding an offset time (Offset) to the residence time (Tr) of the unsent data in the target logical channel is less than the residence upper limit time (Tul). The offset time (Offset) may be a variable parameter configured for each logical channel to the UE 100 by the gNB 200. The offset time (Offset) may be configured by the logical channel configuration message of the RRC layer. Note that the offset time (Offset) may be zero.

In a case of YES in step S103, in other words, in a case that the residence time (Tr) is within the period T1 in FIG. 9, then in step S104, the MAC layer of the UE 100 executes normal LCP processing on the target logical channel. Subsequently, the processing proceeds to step S108.

On the other hand, in a case of NO in step S103, then in step S105, the MAC layer of the UE 100 determines whether the residence time (Tr) of the unsent data in the target logical channel is equal to or greater than the residence upper limit time (Tul).

In a case of YES in step S105, in other words, in a case that the residence time (Tr) is within the period T3 of FIG. 9, then in step S106, the MAC layer of the UE 100 executes processing for discarding the unsent data in the target logical channel. Instead of such data discard processing or in addition to such data discard processing, the MAC layer of the UE 100 may execute abnormality detection processing for detecting or notifying occurrence of an abnormality.

Here, the abnormality detection processing may include processing for detecting a Radio Link Failure (RLF). In this case, the RRC layer of the UE 100 detects an RLF and executes RRC Reestablishment processing. The abnormality detection processing may include processing for notifying the gNB 200 of the abnormality. In this case, the RRC layer (or MAC layer) of the UE 100 transmits an abnormality notification message to the gNB 200. The abnormality detection processing may include processing for notifying the upper layer of the MAC layer (e.g., RLC layer, RRC layer, or application layer) of the abnormality from the MAC layer of the UE 100. Subsequently, the processing proceeds to step S109.

On the other hand, in a case of NO in step S105, in other words, in a case that the residence time (Tr) is within the period T2 in FIG. 9, then in step S107, the MAC layer of the UE 100 executes the above-described priority resource allocation. The priority resource allocation is processing for allocating, to the target logical channel, the resource that is larger than the PBR configured for the target logical channel, regardless of the priority configured for the target logical channel. In the priority resource allocation, the MAC layer of the UE 100 may allocate, to the target logical channel, a resource obtained by multiplying, by the residence time (Tr), the PBR configured for the target logical channel. In the priority resource allocation, the MAC layer of the UE 100 may consider the target logical channel to have the highest priority (e.g., the priority value "0", which is higher than the highest priority value "1" that can be configured by the gNB 200). Subsequently, the processing proceeds to step S108.

In step S108, when the resource allocation to each logical channel ends, the MAC layer of the UE 100 generates a data block (payload MAC PDU) from the data of each logical channel and provides the data block to the PHY layer. As a result, the data block is transmitted from the UE 100 to the gNB 200.

Here, in a case that the priority resource allocation is performed in S107, the UE 100 may notify the gNB 200 that the priority resource allocation has been performed. The notification may be provided by using a MAC Control Element (CE), or may be multiplexed into the data block and transmitted (i.e., may be transmitted simultaneously with the data block). The notification may include number (LCH number) of logical channel on which the priority resource allocation is performed.

In step S109, the MAC layer of the UE 100 resets the measured residence time (Tr) to zero in response to completion of the data transmission in step S108.

As described above, according to the first embodiment, the MAC layer of the UE 100 measures the residence time (Tr) of the unsent data to be transmitted to the gNB 200 via the logical channel and allocates, based on the residence time (Tr), a resource for data transmission to the logical channel. By thus introducing the concept of the residence time into the LCP, the unsent data can be preferentially transmitted before the residence time reaches the residence upper limit time (Tul).

Second Embodiment

Now, a second embodiment will be described with focus placed on differences from the first embodiment described above.

Overview of SR and BSR

Figure 11:
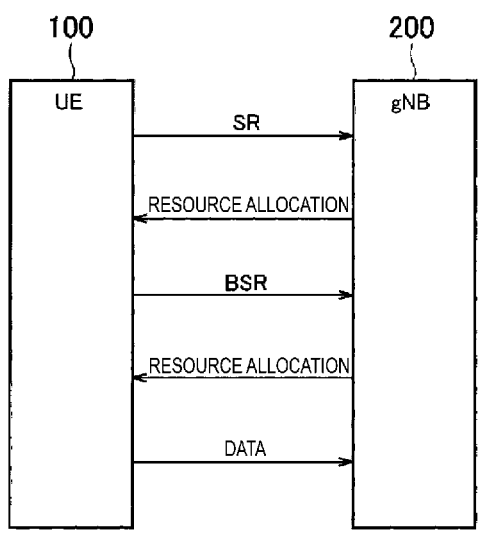
FIG. 11 is a diagram illustrating an SR signal and a BSR according to a second embodiment.

A Scheduling Request (SR) signal and a buffer status report (BSR) according to the second embodiment will be described. FIG. 11 is a diagram illustrating the SR signal and the BSR according to the second embodiment.

As illustrated in FIG. 11, the MAC layer 150 of the UE 100 includes a function to notify of, by the BSR, the amount of data in the transmission buffer corresponding to each logical channel. The gNB 200 allocates an uplink radio resource to the UE 100, based on the BSR. In BSR, the MAC layer 150 allocates each logical channel to a Logical Channel Group (LCG) and notifies the gNB 200 of the amount of transmission buffer for each LCG as a message of the MAC layer.

There are several conditions for triggering the BSR. For example, in a case that transmittable data is generated and, further, that the data has a higher priority for the logical channel than the data in the transmission buffer, the BSR is triggered and notified. The BSR may be triggered and notified in a case that a regular timer expires.

In a case that no radio resource (physical uplink shared channel (PUSCH)) for notification of the BSR has been allocated when the BSR is triggered, the MAC layer 150 indicates to the PHY layer to transmit the SR. The MAC layer 150 transmits the BSR after a radio resource is allocated.

In a case that the PHY layer is indicated by the MAC layer 150 to transmit the SR, the PHY layer transmits the SR via a physical uplink control channel (PUCCH). Note that in a case that no physical uplink control channel PUCCH for SR transmission is allocated to the PHY layer, the PHY layer requests resource allocation by using a physical random access channel (PRACH).

Communication Control Method According to Second Embodiment

Now, a communication control method according to the second embodiment will be described.

In the first embodiment described above, an example has been described in which the concept of the residence time (Tr) is introduced into the LCP processing of the MAC layer.

On the other hand, in the second embodiment, the SR or the BSR is used to notify the gNB 200 of time information based on the residence time (Tr), thus allowing the gNB 200 to take the residence time (Tr) into account in allocating a resource to the UE 100. Accordingly, the gNB 200 can appropriately determine the urgency and the amount of allocation to allocate the uplink radio resource for the UE 100.

Specifically, the communication control method according to the second embodiment is a method executed by the UE 100 and includes the step of measuring the residence time of unsent data to be transmitted by the UE 100 via a logical channel and the step of notifying the gNB 200 of time information based on the residence time. The time information is information referenced by the gNB 200 to allocate the uplink radio resource to the UE 100.

Here, the step of measuring and the step of notifying may be executed by the MAC layer of the UE 100. The step of notifying may include the step of transmitting, to the gNB 200, a MAC layer message including the time information. Here, the MAC layer message may be a BSR indicating the amount of unsent data. Specifically, the MAC layer message may be an extended format of the existing BSR. Alternatively, a new MAC layer message in a format different from the format of the existing BSR may be defined.

Alternatively, the step of notifying may include the step of transmitting the SR signal to the gNB 200 by using a radio resource associated with the time information. For example, the association between the PUCCH resource and the time information is notified from the gNB 200 to the UE 100 in advance, and the UE 100 transmits the SR signal to the gNB 200 using the PUCCH resource associated with the time information generated by the UE 100. In this way, the gNB 200 can identify the time information from the PUCCH resource used for transmission of the SR signal. In a case that such an SR signal is transmitted, the UE 100 may disable a prohibition timer that prohibits transmission of the current SR until a certain amount of time has elapsed since the last transmission of the SR. In other words, the UE 100 may be able to transmit the SR signal for notifying the gNB 200 of the time information even when the prohibition timer is running.

The UE 100 may notify the gNB 200 of the time information based on the residence time (Tr) exclusively in a case that data is generated in the target logical channel (bearer) for which the communication timeout time is configured or that data is generated in the LCG to which the target logical channel belongs (or such a logical channel is configured for the UE 100). Alternatively, the UE 100 may perform the notification only for the target logical channel for which the notification of the time information based on the residence time (Tr) is allowed (configured).

Figure 12:
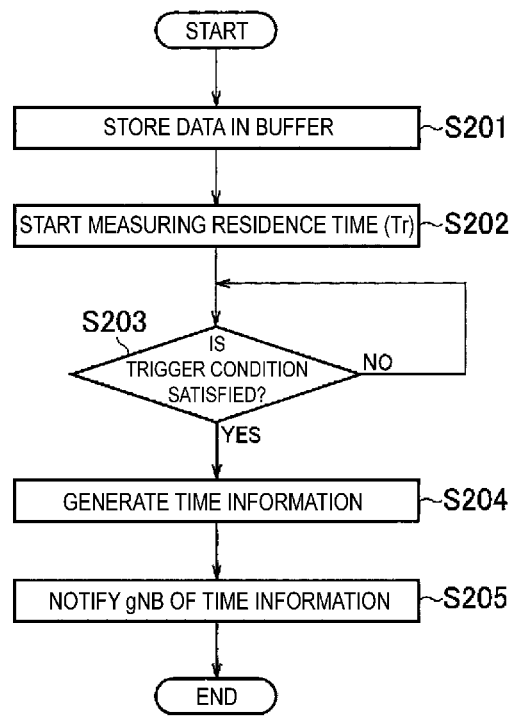
FIG. 12 is a diagram illustrating a flowchart example of a communication control method according to the second embodiment.

FIG. 12 is a diagram illustrating a flowchart example of the communication control method according to the second embodiment.

As illustrated in FIG. 12, in step S201, data is stored in a transmission buffer associated with the target logical channel. Step S201 is similar to step S101 in FIG. 10.

In step S202, the MAC layer of the UE 100 starts measuring the residence time (Tr) of the unsent data stored in the transmission buffer in step S201. Step S202 is similar to step S102 of FIG. 10.

In step S203, the MAC layer of the UE 100 determines whether a trigger condition for notifying the gNB 200 of the time information based on the residence time (Tr) in the target logical channel is satisfied. The trigger condition may be similar to or different from the trigger condition for the normal BSR.

For example, the trigger condition may be a condition that the residence time (Tr) in the target logical channel exceeds a time threshold. The trigger condition may be a condition that time obtained by subtracting the residence time (Tr) in the target logical channel from the communication timeout time associated with the target logical channel is less than or equal to the time threshold. The trigger condition may be a condition that data is generated in (enters) the target logical channel. The trigger condition may be a condition that the residence time (Tr) exceeds a certain value (e.g., the T2 period in FIG. 9). The trigger condition may be configurable for the UE 100 by the gNB 200. The SR related to the BSR transmission triggered based on each of the conditions described above may be transmitted by using special resources different from the normal PUCCH resource. The special resource may be configured for the UE 100 by the gNB 200.

Here, the time threshold may be a variable parameter configured for each logical channel to the UE 100 by the gNB 200. The time threshold may be configured by the logical channel configuration message of the RRC layer.

In a case that the trigger condition is satisfied (step S203: YES), then in step S204, the MAC layer of the UE 100 generates time information based on the residence time (Tr) in the target logical channel. The time information may be information indicating the residence time (Tr) in the target logical channel.

The time information may be information generated based on the residence time (Tr) in the target logical channel and the communication timeout time associated with the target logical channel. For example, the time information may be information indicating time obtained by subtracting the residence time (Tr) from the communication timeout time. The time information may be information indicating time obtained by subtracting the residence time (Tr) and the offset time from the communication timeout time.

In step S205, the MAC layer of the UE 100 notifies the gNB 200 of the time information generated in step S204.

In this manner, according to the second embodiment, the MAC layer of the UE 100 measures the residence time (Tr) of unsent data to be transmitted to the gNB 200 via the logical channel and notifies the gNB 200 of time information based on the residence time (Tr). Accordingly, the gNB 200 can appropriately determine the urgency and the amount of allocation to allocate the uplink radio resource for the UE 100.

Other Embodiments

In the above-described embodiments, as the operation of the MAC layer 150 in the UE 100, the uplink operation has mainly been described. However, the operation is not limited to the uplink. The configuration and operation according to the above-described embodiments may be applied to a sidelink or the downlink, for example. The sidelink is a link used for direct communication between UEs 100. In other words, the wireless communication partner of the UE 100 is not limited to the gNB 200 and may be any other UE 100.

In the above-described embodiments, the operation in the UE 100 has mainly been described. However, the configuration and operation according to the above-described embodiments may be applied to an IAB node corresponding to a wireless relay station. In other words, the IAB node may perform the operation of the UE 100 described in the above-described embodiments. Specifically, the IAB node includes a terminal function (MT function) for communicating with a parent node, and the configuration and operation according to the above-described embodiments may be applied to this terminal function (MT function).

In the embodiments described above, an example has been described in which the 5GS 1 is applied to the industrial network 30. However, even in a case that the 5GS 1 is not applied to the industrial network 30, the configuration and operation according to the above-described embodiments can be implemented.

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like.

In addition, circuits for executing the processes to be performed by the UE 100 or the gNB 200 may be integrated, and at least part of the UE 100 or the gNB 200 may be configured as a semiconductor integrated circuit (a chipset or an SoC).

Embodiments have been described above in detail with reference to the drawings, but specific configurations are not limited to those described above, and various design modifications can be made without departing from the gist of the present disclosure.

The invention claimed is:

1. A communication control method executed by a user equipment, the communication control method comprising:
measuring a residence time of unsent data to be transmitted by the user equipment to a base station via a logical channel; and
allocating in a MAC layer of the user equipment, to the logical channel, a resource for data transmission based on the residence time,
wherein the allocating comprises:
allocating the resource to the logical channel preferentially over other logical channels to inhibit the residence time from exceeding a residence upper limit time configured for the logical channel; and
allocating, to the logical channel and when the residence time reaches a predetermined time, the resource that is larger than a predetermined resource regardless of priority configured for the logical channel, wherein the predetermined time is time shorter than the residence upper limit time,
the predetermined resource is a minimum resource guaranteed for the logical channel;
wherein the residence upper limit time is a variable parameter configured for the user equipment by the base station.

2. A user equipment comprising:
a transmitter that performs a data transmission to a base station; and
a controller that measures a residence time of unsent data to be transmitted to the base station via a logical channel, wherein the controller that allocates, in a MAC layer, to the logical channel, a resource for the data transmission based on the residence time,
wherein the allocating comprises:
allocating the resource to the logical channel preferentially over other logical channels to inhibit the residence time from exceeding a residence upper limit time configured for the logical channel; and
allocating, to the logical channel and when the residence time reaches a predetermined time, the resource that is larger than a predetermined resource regardless of priority configured for the logical channel, wherein the predetermined time is time shorter than the residence upper limit time,
the predetermined resource is a minimum resource guaranteed for the logical channel;
wherein the residence upper limit time is a variable parameter configured for the user equipment by the base station.

* * * * *